US008874172B2

(12) United States Patent
Jiang et al.

(10) Patent No.: US 8,874,172 B2
(45) Date of Patent: Oct. 28, 2014

(54) EVALUATING LOST COMMUNICATION LINKS WITH MOBILE STATIONS

(75) Inventors: Frances Jiang, Whippany, NJ (US); Vladan Jovanovic, Morris Plains, NJ (US); Yang Yang, Parsippany, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2552 days.

(21) Appl. No.: 11/239,536

(22) Filed: Sep. 29, 2005

(65) Prior Publication Data

US 2007/0072643 A1 Mar. 29, 2007

(51) Int. Cl.
*H04B 1/38* (2006.01)
*H04W 36/00* (2009.01)

(52) U.S. Cl.
CPC .................................. *H04W 36/0083* (2013.01)
USPC ............................ 455/560; 455/445; 370/218

(58) Field of Classification Search
USPC ................ 455/552.1, 553.1, 423, 432.1–439, 455/442–445; 370/242.1, 241, 241.1, 370/331–334; 700/32
See application file for complete search history.

(56) References Cited

U.S. PATENT DOCUMENTS

| 5,987,306 | A  | * | 11/1999 | Nilsen et al. ................ 455/67.11 |
| 5,995,830 | A  | * | 11/1999 | Amin et al. ..................... 455/423 |
| 7,181,204 | B2 | * | 2/2007  | Alfano et al. .................. 455/423 |
| 2004/0037222 | A1 | * | 2/2004 | Kim et al. ...................... 370/229 |
| 2005/0159153 | A1 | * | 7/2005 | Mousseau et al. .......... 455/432.1 |
| 2005/0272424 | A1 | * | 12/2005 | Gallagher et al. .......... 455/435.1 |
| 2006/0040681 | A1 | * | 2/2006 | Julka et al. ..................... 455/458 |
| 2006/0246924 | A1 | * | 11/2006 | Balasubramanian et al. 455/459 |
| 2009/0061879 | A9 | * | 3/2009  | Gallagher et al. ............. 455/439 |

* cited by examiner

*Primary Examiner* — Chuong A Ngo
(74) *Attorney, Agent, or Firm* — Carlson, Gaskey & Olds

(57) ABSTRACT

A wireless communication system (20) includes an ability to discern whether an end of a communication link between a mobile station (22) and a base station (26) corresponds to the mobile station (22) tuning away from a first service to a second, different service. In a disclosed example, a radio network controller (28) includes a link monitoring portion that uses information regarding the mobile station from the second service to determine a pattern of expected tune aways by the mobile station to the second service. In one disclosed example, the link monitoring portion uses observed mobile station behavior to estimate the pattern of expected tune aways. Whenever an end of a communication link with the mobile station corresponds to an expected tune away, that end is not considered for purposes of service measurement parameters. The disclosed examples provide the ability to avoid mistakenly considering a mobile station-initiated tune away as a dropped link or handoff failure resulting from an issue with the system.

24 Claims, 2 Drawing Sheets

EVALUATING LOST COMMUNICATION LINKS WITH MOBILE STATIONS

FIELD OF THE INVENTION

This invention generally relates to communication. More particularly, this invention relates to wireless communication systems.

DESCRIPTION OF THE RELATED ART

Wireless communication systems are well known and in widespread use. Wireless communication networks typically have a plurality of base stations strategically positioned to provide wireless service coverage over selected geographic regions, for example. Mobile stations such as cell phones, notebook computers and personal digital assistants communicate with the base stations to utilize the wireless network. Communications between the mobile stations and the base stations occur over a forward link, which includes signaling from the base station to the mobile station, and a reverse link, which includes signaling from the mobile station to the base station.

There are a variety of situations where the communication link between a mobile station and a base station is dropped. Sometimes a dropped link is the result of a system shortcoming or failure. Wireless service providers monitor dropped links to analyze or enhance their systems to provide better customer service.

One difficulty in monitoring dropped links is that various circumstances can be misidentified as a problematic drop. There are circumstances where a mobile station autonomously ends a communication link with a base station without providing an indication to the base station regarding the reason for ending the link.

For example, so-called hybrid mobile stations are capable of communicating with more than one wireless service. Some hybrid mobile stations can communicate with a data network and a separate voice network. When such a mobile station is utilizing the data network, the mobile station typically tunes away from the data network to communicate with the voice network to check for paging messages from the voice system or to measure radio frequency conditions to assist with triggering a hybrid handoff at the edge of coverage of the data system.

Mobile stations execute such tune aways autonomously and without any support from the data system. The mobile stations typically do not provide any indication to the data system that a tune away is about to happen.

Mobile stations typically execute such tune aways in a pattern that is defined by a slot cycle index (SCI), which is determined by the network-wide SCI parameter that is set in the voice system. Mobile stations typically have an internal setting for SCI selection. Practical resulting SCI's in real networks range from 0 to 2, which corresponds to a pattern of tune aways every 1.28, 2.56 or 5.12 seconds.

Typical tune aways last approximately 200 milliseconds. There are occasions when mobile stations may remain tuned away for a longer time. One example is when the customer is paged and picks up a voice call on the voice system. In such a case, the mobile station may not return to the data connection for several minutes. Even without actual incoming voice calls, tune aways can last as long as one second or even tens of seconds.

Longer tune aways cause problems from a service measurement perspective. A long tune away may be misidentified as a lost radio frequency communication link or a handoff failure.

Base stations typically include a modem that detects a loss of the reverse radio link. In many instances, the base station notifies a radio network controller when such loss events are detected. If the radio link does not come back within a certain period of time, the wireless system claims the RF link with the mobile station is lost.

Such information is used for service measurement purposes to detect coverage holes.

When a long mobile station tune away causes a false detection of a lost link, that is problematic because it provides misleading service measurement data and interferes with the task of coverage optimization. There is a need for an ability to avoid misidentifying mobile station tune aways as RF losses or dropped links that are the fault of the system. This invention addresses that need.

SUMMARY OF THE INVENTION

An exemplary method of communicating includes determining if an end of a communication link for a first service corresponds to a mobile station tuning away to a second, different service.

One example includes determining at least one time when the mobile station is expected to at least temporarily tune away to the second service. A determination whether a time associated with the end of the communication link corresponds to the at least one determined time when the mobile station is expected to tune away provides an indication if the end of the communication link corresponds to the mobile station tuning away to the second service.

One example includes determining a pattern of times when the mobile station is expected to at least temporarily tune away to the second surface. The pattern may be determined in one of several ways. One example includes obtaining information from the second service that is indicative of the pattern for a mobile station. That obtained information can then be used for determining a pattern of expected tune aways. In another example, mobile station behavior is tracked to estimate a pattern of tune aways and that estimated pattern is used for determining whether a loss of the communication link corresponds to a tune away.

In one example, whenever a time for the loss of a communication link corresponds to an expected tune away by the mobile station, the system excludes the loss of that link from service measurement data that is used for tracking potential problems or shortcomings in the system potentially associated with dropped links.

An exemplary disclosed radio network controller includes a link monitoring module that determines if an end to the communication link for the service corresponds to a mobile station turning away to a different service. In one example, the radio network controller is involved with providing one service but not the other.

In one example, the radio network controller obtains information from the system that handles the other service about the mobile station that is indicative of a pattern of tune aways for the mobile station. The radio network controller then uses that information to determine a pattern of tune aways. The radio network controller monitors any ends of the communication link with the mobile station and determines whether they correspond to an expected time for a tune away.

In one example, the radio network controller tracks performance of the mobile station to estimate a pattern of tune aways. The estimated pattern then allows the radio network controller to determine whether an end of a communication link with the mobile station corresponds to the mobile station tuning away to another service.

The various features and advantages of this invention will become apparent to those skilled in the art from the following detailed description. The drawings that accompany the detailed description can be briefly described as follows.

DETAILED DESCRIPTION

Figure 1:
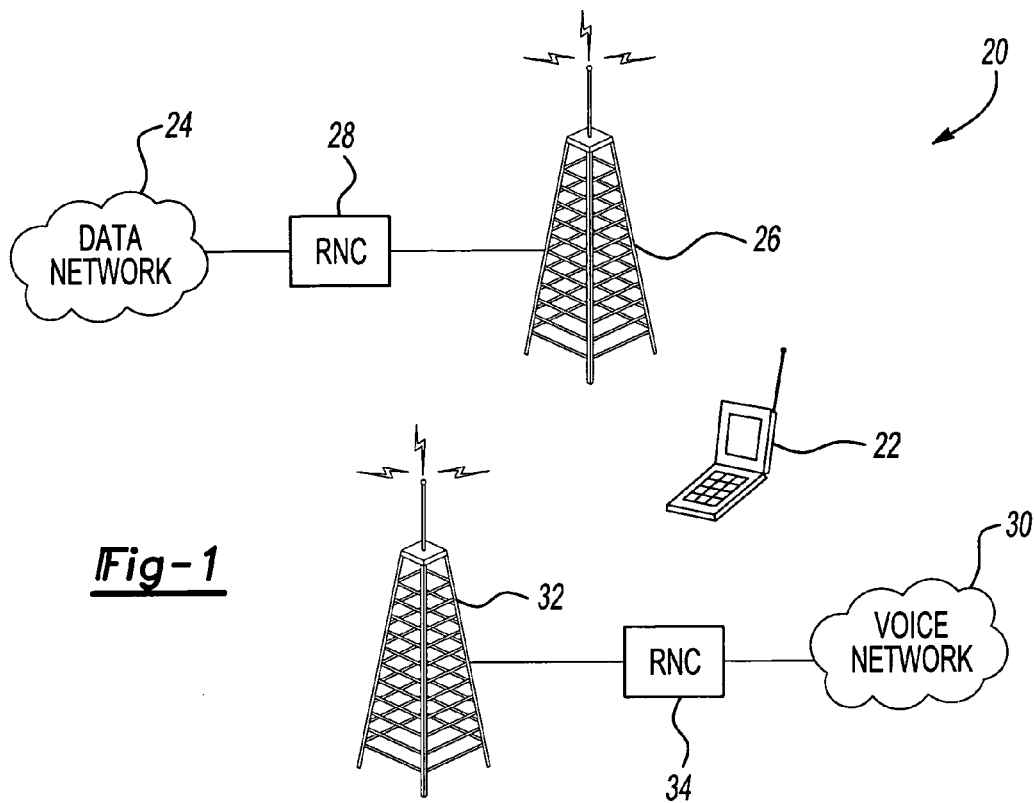
FIG. 1 schematically illustrates selected portions of a wireless communication system incorporating an embodiment of this invention.

FIG. 1 schematically shows selected portions of a wireless communication system 20. A mobile station 22 is a so-called hybrid mobile station capable of communicating with more than one type of service.

In the illustrated example, a first network 24 provides data services. One example includes a 1xEV system as the network 24. The mobile station 22 accesses the services of the network 24 by communicating with an example base station 26 in a known manner. The base station 26 communicates with a radio network controller (RNC) 28 in a generally known manner.

One feature of the radio network controller 28 is that it includes a link monitoring portion that monitors the status of a communication link with the mobile station 22. The link monitoring portion provides the advantage of avoiding misidentifying instances when the mobile station 22 autonomously tunes away to another service as a lost or dropped communication link (e.g., RF connection) as if that were due to a fault or shortcoming of the network 24.

The example of FIG. 1 includes a second network 30 that provides another, different service that the mobile station 22 may access. One example includes a voice communication service. One example includes a CDMA2000 system as the second network 30. The mobile station 22 accesses services provided by the second network 30 by communicating with a base station 32 in a known manner. A radio network controller 34 provides an interface between the base station 32 and other portions of the network 30 in a known manner. In one example, the radio network controller 34 includes a link monitoring portion similar to that within the RNC 28.

One feature of the disclosed example is that it provides the ability to determine whether an end of a communication link between one of the base stations 26 or 32 and the mobile station 22 corresponds to the mobile station tuning away to the other service.

Figure 2:
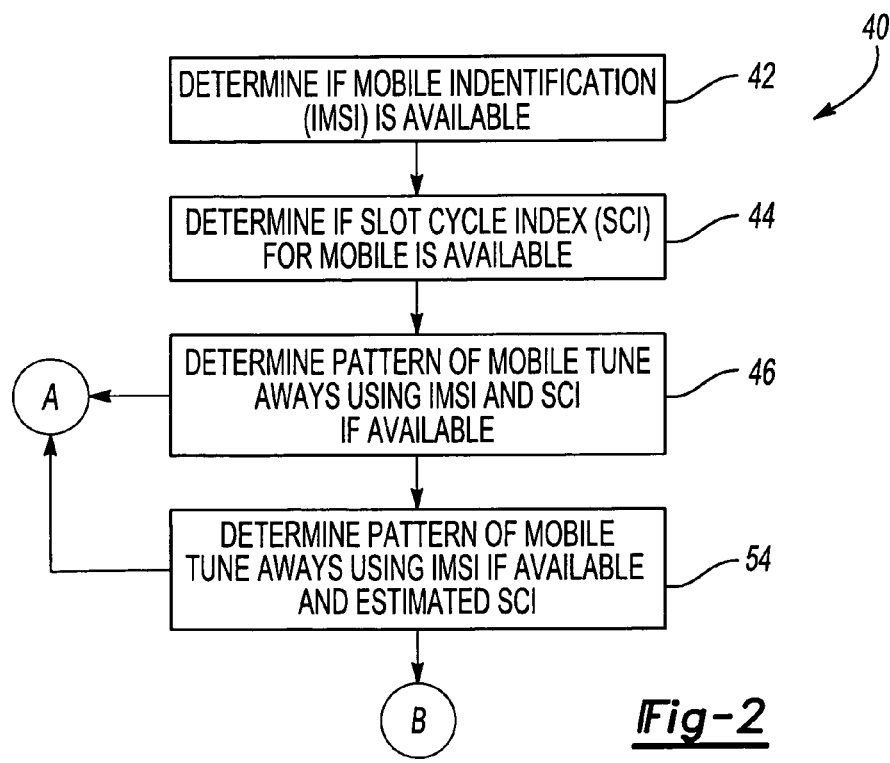
FIGS. 2 and 3 show a flowchart diagram summarizing one example approach.
Figure 3:
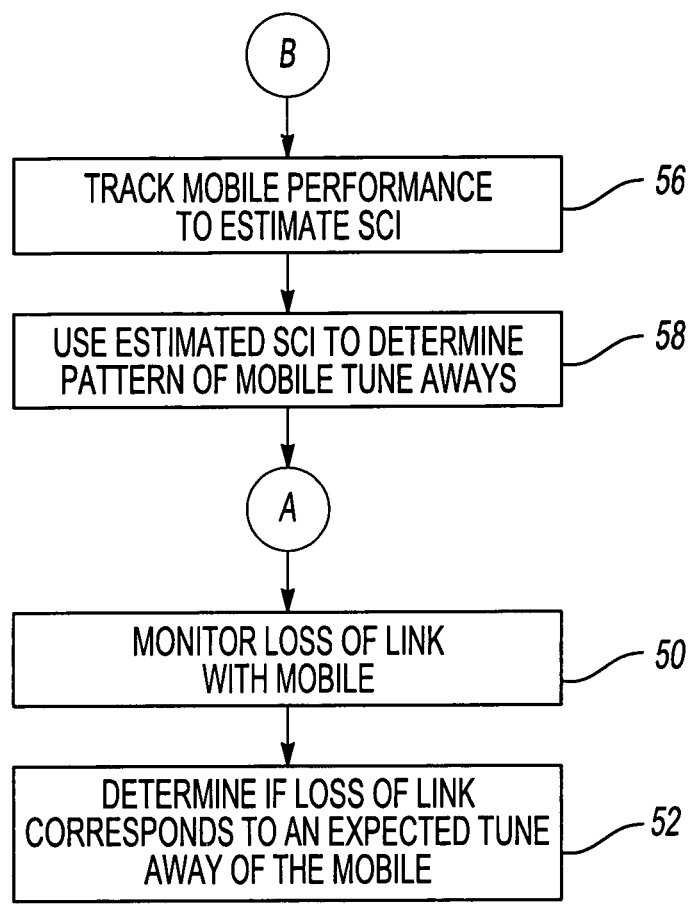

FIGS. 2 and 3 include a flowchart diagram 40 summarizing one example approach for making such a determination. At 42, the RNC 28 attempts to obtain information regarding the mobile station from the other service or network 30. In one particular example, a determination is made whether mobile identification information such as the international mobile subscriber identification (IMSI) is available from the network 30. One example includes an interface (not illustrated) that allows the RNC 28 to obtain such information from the network 30.

At 44, the RNC 28 and in particular the link monitoring portion determines if a tune-away slot cycle index (SCI) for the mobile station 22 is available. Assuming the IMSI for the mobile station 22 and the SCI are available, the example process continues at 46 where the link monitoring portion of the radio network controller 28 determines a pattern of tune aways for the mobile station 22 using the SCI for the mobile station 22. In case there are timing differences between the first network 24 and the second network 30, conversions of timing factors allows the radio network controller 28 to estimate a pattern of tune aways for the mobile station 22 in terms corresponding to timing information used for the services provided by the network 24. For example, based on a 3G-1X hashing algorithm, the RNC 28 can identify the paging slot index for the mobile station 22. The RNC 28 translates that into a DO slot index. A time when the mobile station 22 is expected to tune away) is calculated. The determined system time is then converted into system time corresponding to the operation of the network 24 (e.g., 1xEV system time). In one example, the 1xEV system time is based on the slot unit (e.g., 1.666 milliseconds) rather than the traffic frame unit (e.g., 20 milliseconds).

In one example, this information is used to establish a pattern of when the mobile station 22 is expected to tune away from the service provided by the first network 24 to the service provided by the second network 30 (e.g., tune away from the 1xEV system to the 3G-1X system).

In the example of FIG. 3, at 50, the RNC 28 monitors any loss of the link with the mobile station 22. In one example, a reverse link modem of the base station 26 provides appropriate signals to the RNC 28 whenever there is a detected loss of the reverse link from the mobile station 22 to the base station 26. At 52, the RNC 28 determines if an end of the link corresponds to an expected tune away of mobile station 22.

In one example this involves setting a flag within the link monitoring processing at the RNC 28 that will disable incrementing a radio frequency link loss counter and a handoff failure counter whenever an incoming link-loss notification falls within the expected interval of tune aways by the mobile station 22. The flag is reset once an incoming link-detection notification arrives. In one example, only a link-detection notification arriving after a matching link-loss notification will be accepted for that purpose.

By establishing a pattern of times for the expected tune aways by the mobile station, the RNC 28 is able to discriminate between handoff failures, dropped links and mobile station tune aways, for example. Because the tune aways are autonomously and intentionally executed by the mobile station, service measurement parameters need not account for those that are long enough to otherwise be considered a dropped link, resulting in more reliable and accurate information.

In some instances, the SCI for the mobile station 22 from the second network 30 may not be available to the first network RNC 28. The example of FIG. 2 includes a step at 54 where a pattern of mobile station tune aways are determined using the IMSI of the mobile station 22 (if available) and an estimated SCI. One example includes estimating the SCI to be the lowest value for a given mobile station (e.g., SCI=0). This corresponds to the most frequent possible tune away, for that mobile station. Assuming SCI=0 may introduce a small error but, in some embodiments, provides more reliability because it is more likely to capture expected tune away times than selecting a longer interval between tune aways, for example.

The estimated SCI information can be used to estimate a pattern of tune aways for the mobile station in the same manner described above.

In some examples, the IMSI may not be available to the RNC 28. The example of FIG. 3 includes a step at 56 where the RNC 28 tracks the mobile performance based upon observed RF link loss notifications from the base station 26 regarding the mobile station 22. The example RNC 28 includes appropriate programming to estimate a pattern of tune aways based on the observed mobile performance. The example of FIG. 3 includes tracking the mobile station performance to estimate an SCI value at 56. At 58, the estimated SCI is used to determine the pattern of mobile station tune aways. The estimated pattern is then used to provide information for determining whether an end of a communication link corresponds to a mobile station tune away.

Given this description, those skilled in the art will be able to select from using IMSI information from the other system, SCI information, estimated SCI information, an estimated pattern of tune aways based upon mobile observation or a combination of those to best meet the needs of their particular situation. The disclosed examples provide the ability to discern whether an end of the communication link with the mobile station resulting in an FSI message, for example, corresponds to a problem with the system or the mobile station tuning away to another service.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising:
   determining if an end of a communication link for a first service corresponds to a mobile station tuning away to a second, different service; and
   identifying the end of the communication link as at least one of a failed handoff or a dropped link if the end of the communication link for the first service does not correspond to the mobile station tuning away to the second, different service.

2. The method of claim 1, comprising:
   determining at least one time when the mobile station is expected to at least temporarily tune away to the second service; and
   determining if a time associated with the end of the communication link corresponds to the at least one determined time.

3. The method of claim 2, comprising determining a pattern of times when the mobile station is expected to at least temporarily tune away to the second service.

4. The method of claim 3, comprising:
   obtaining information from the second service that is indicative of the pattern; and
   using the obtained information for determining the pattern.

5. The method of claim 4, wherein the information comprises an identifier for the mobile station.

6. The method of claim 5, comprising:
   using the identifier to determine a second service time interval between expected tune aways for the mobile station; and
   determining a first service time interval between the expected tune aways.

7. The method of claim 6, comprising:
   simulating tune aways of the mobile station using the determined first service time interval; and
   determining if a time corresponding to the end of the communication link corresponds to a time corresponding to at least one simulated tune away.

8. The method of claim 5, wherein the information comprises a slot cycle index for the mobile station that indicates times for the tune aways dictated by the second service.

9. The method of claim 3, comprising:
   monitoring a performance of the mobile station; and
   using the monitored performance for determining the pattern.

10. The method of claim 9, comprising:
    detecting times when there is an interruption in a reverse link between the mobile station and a base station; and
    using the detected times to determine the pattern.

11. The method of claim 1, comprising determining if a time associated with the end of the communication link is within a selected window of a time when the mobile station is expected to tune away to the second service.

12. The method of claim 1, wherein the first service comprises a wireless voice or data communication service; and
    the second service comprises a different voice or data communication service.

13. The method of claim 12, wherein the mobile station comprises a hybrid mobile station having a capability to selectively communicate using the first service or the second service.

14. The method of claim 1, wherein one of the first service or the second service comprises a voice communication service and the other of the second service or the first service comprises a data communication service.

15. The method of claim 1, wherein the end of the communication link is caused by the mobile station tuning away to the second service.

16. A radio network controller, comprising:
    a link monitoring portion that determines if an end of a communication link for a first service corresponds to a mobile station turning away to a second, different service, the link monitoring portion determining that the end of the communication link is at least one of a failed handoff or a dropped link if the end of the communication link is at least one of a failed handoff or a dropped link f the end of the communication link for the first service does not correspond to the mobile station tuning away to the second, different service.

17. The radio network controller of claim 16, wherein the radio network controller is associated with providing the first service but not the second service.

18. The radio network controller of claim 16, wherein the link monitoring portion will not include an end of the communication link for the first service that corresponds to the mobile station turning away to the second service in a service measurement determination.

19. The radio network controller of claim 16, wherein the link monitoring portion determines at least one time when the mobile station is expected to at least temporarily tune away to the second service and determines if a time associated with the end of the communication link corresponds to the at least one determined time.

20. The radio network controller of claim 19, wherein the link monitoring portion determines a pattern of times when the mobile station is expected to at least temporarily tune away to the second service.

21. The radio network controller of claim 20, wherein the link monitoring portion obtains information from the second service that is indicative of the pattern and uses the obtained information for determining the pattern.

22. The radio network controller of claim 20, wherein the link monitoring portion uses observed mobile station behavior to estimate the pattern.

23. The radio network controller of claim 16, wherein one of the first service or the second service comprises a voice communication service and the other of the second service or the first service comprises a data communication service.

24. The radio network controller of claim 16, wherein the end of the communication link is caused by the mobile station tuning away to the second service.

* * * * *